(12) United States Patent
Okuyama

(10) Patent No.: US 11,691,290 B2
(45) Date of Patent: Jul. 4, 2023

(54) ROBOT CONTROL METHOD AND ROBOT SYSTEM

(71) Applicant: Seiko Epson Corporation, Toyko (JP)

(72) Inventor: Masayuki Okuyama, Suwa (JP)

(73) Assignee: SEIKO EPSON CORPORATION

( * ) Notice: Subject to any disclaimer, the term of this patent is extended or adjusted under 35 U.S.C. 154(b) by 171 days.

(21) Appl. No.: 17/186,038

(22) Filed: Feb. 26, 2021

(65) Prior Publication Data

US 2021/0268660 A1 Sep. 2, 2021

(30) Foreign Application Priority Data

Feb. 28, 2020 (JP) .................................. 2020-033136

(51) Int. Cl.
*B25J 9/16* (2006.01)
*B25J 13/08* (2006.01)

(52) U.S. Cl.
CPC ........... *B25J 9/1697* (2013.01); *B25J 9/1633* (2013.01); *B25J 9/1653* (2013.01); *B25J 9/1664* (2013.01); *B25J 13/085* (2013.01); *B25J 13/089* (2013.01)

(58) Field of Classification Search
CPC ....... B25J 9/1633; B25J 9/1664; B25J 9/1697
See application file for complete search history.

(56) References Cited

U.S. PATENT DOCUMENTS

2018/0353253 A1* 12/2018 Bowling ........ A61B 17/320068

FOREIGN PATENT DOCUMENTS

| JP | H07-100755 A | 4/1995 | |
|----|----|----|----|
| JP | H08-016225 A | 1/1996 | |
| JP | 2015-206742 A | 11/2015 | |
| WO | WO-2019136124 A1 * | 7/2019 | ............ B25J 9/1612 |

* cited by examiner

*Primary Examiner* — Jeff A Burke
*Assistant Examiner* — Christopher A Buksa
(74) *Attorney, Agent, or Firm* — Harness, Dickey & Pierce, P.L.C.

(57) ABSTRACT

A robot control method for controlling a robot including a robot arm that performs predetermined work on a work target object, the robot control method including a target-position setting step for setting, on simple shape data predicted from a plurality of projection shapes obtained by projecting the work target object from different directions, a plurality of target positions to which a control point of the robot arm in performing the predetermined work is moved and a driving step for driving the robot arm with force control based on the plurality of target positions set in the target-position setting step and force applied to the robot arm and performing the predetermined work.

6 Claims, 8 Drawing Sheets

ROBOT CONTROL METHOD AND ROBOT SYSTEM

The present application is based on, and claims priority from JP Application Serial Number 2020-033136, filed Feb. 28, 2020, the disclosure of which is hereby incorporated by reference herein in its entirety.

BACKGROUND

1. Technical Field

The present disclosure relates to a robot control method and a robot system.

2. Related Art

There has been known a robot that includes a robot arm, to the distal end of which an end effector is attached, and drives the robot arm to thereby perform predetermined work on a workpiece. In such a robot, for example, as described in JP-A-7-100755 (Patent Literature 1), tool passing points, which are target positions where the distal end of the end effector passes, are set on the surface of the workpiece. The robot arm is driven such that the distal end of the end effector passes the tool passing points.

Patent Literature 1 discloses a method of setting, in three-dimensional data of the workpiece, mesh-like lattice points on the surface of the workpiece and setting the lattice points as the tool passing points. A moving route of the robot arm is generated by setting order for moving to the tool passing points.

However, in the method of setting the tool passing points disclosed in Patent Literature 1, in order to accurately set the tool passing points on the surface of the workpiece, it is necessary to finely set the mesh-like lattice points set on the surface of the workpiece on the three-dimensional data. In this case, the number of tool passing points increases. Processing for the generation of the moving route of the robot arm sometimes takes time. On the other hand, when the mesh-like lattice points set on the surface of the workpiece on the three-dimensional data are roughly set, the tool passing points are sometimes set in positions separated from the surface of the actual workpiece. The predetermined work cannot be accurately performed.

SUMMARY

A robot control method according to an aspect of the present disclosure is a robot control method for controlling a robot including a robot arm that performs predetermined work on a work target object, the robot control method including: a target-position setting step for setting, on simple shape data predicted from a plurality of projection shapes obtained by projecting the work target object from different directions, a plurality of target positions to which a control point of the robot arm in performing the predetermined work is moved; and a driving step for driving the robot arm with force control based on the plurality of target positions set in the target-position setting step and force applied to the robot arm and performing the predetermined work.

A robot control method according to an aspect of the present disclosure is a robot control method for controlling a robot including a robot arm that performs predetermined work on a work target object, the robot control method including: a target-position setting step for setting, on simple shape data predicted from a plurality of projection shapes obtained by projecting the work target object from different directions, a plurality of target positions to which a control point of the robot arm in performing the predetermined work is moved; and a driving step for driving the robot arm with position control based on the plurality of target positions set in the target-position setting step and a separation distance between the work target object and the control point of the robot arm and performing the predetermined work such that the separation distance reaches a predetermined value.

A robot system according to an aspect of the present disclosure includes: a robot arm configured to perform predetermined work on a work target object; a force detecting section configured to detect force applied to the robot arm; a target-position setting section configured to set, on simple shape data predicted from a plurality of projection shapes obtained by projecting the work target object from different directions, a plurality of target positions to which a control point of the robot arm in performing the predetermined work is moved; and a driving control section configured to drive the robot arm with force control based on the plurality of target positions set by the target-position setting section and force applied to the robot arm and perform the predetermined work.

A robot system according to an aspect of the present disclosure includes: a robot arm configured to perform predetermined work on a work target object; a distance detecting section configured to detect a distance between the robot arm and the work target object; a target-position setting section configured to set, on simple shape data predicted from a plurality of projection shapes obtained by projecting the work target object from different directions, a plurality of target positions to which a control point of the robot arm in performing the predetermined work is moved; and a driving control section configured to drive the robot arm with position control based on the plurality of target positions set by the target-position setting section and a detection result of the distance detecting section and perform the predetermined work such that a separation distance between the work target object and the robot arm reaches a predetermined value.

DESCRIPTION OF EXEMPLARY EMBODIMENTS

First Embodiment

Figure 1:
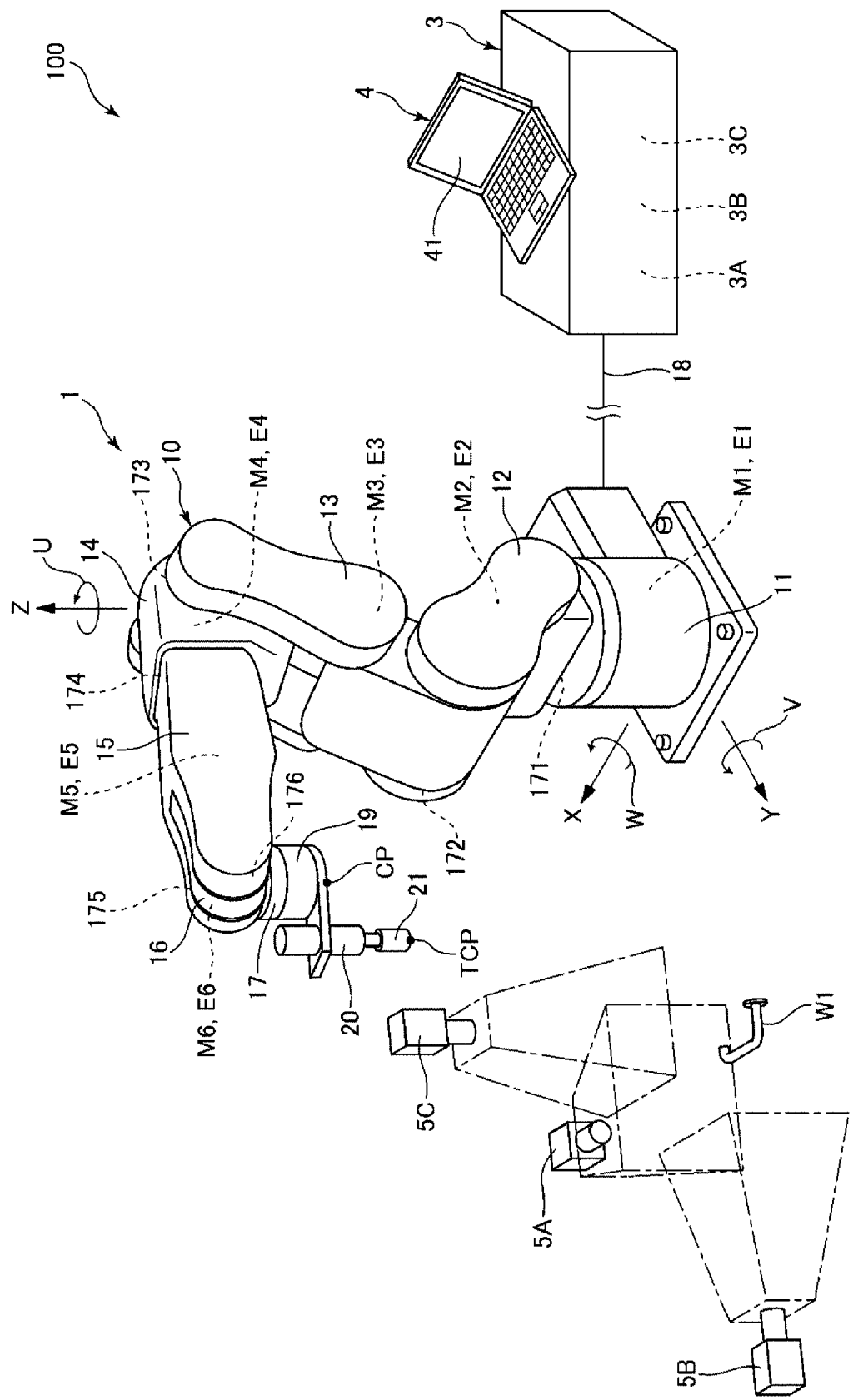
FIG. 1 is a diagram showing an overall configuration of a robot system in a first embodiment.
Figure 2:
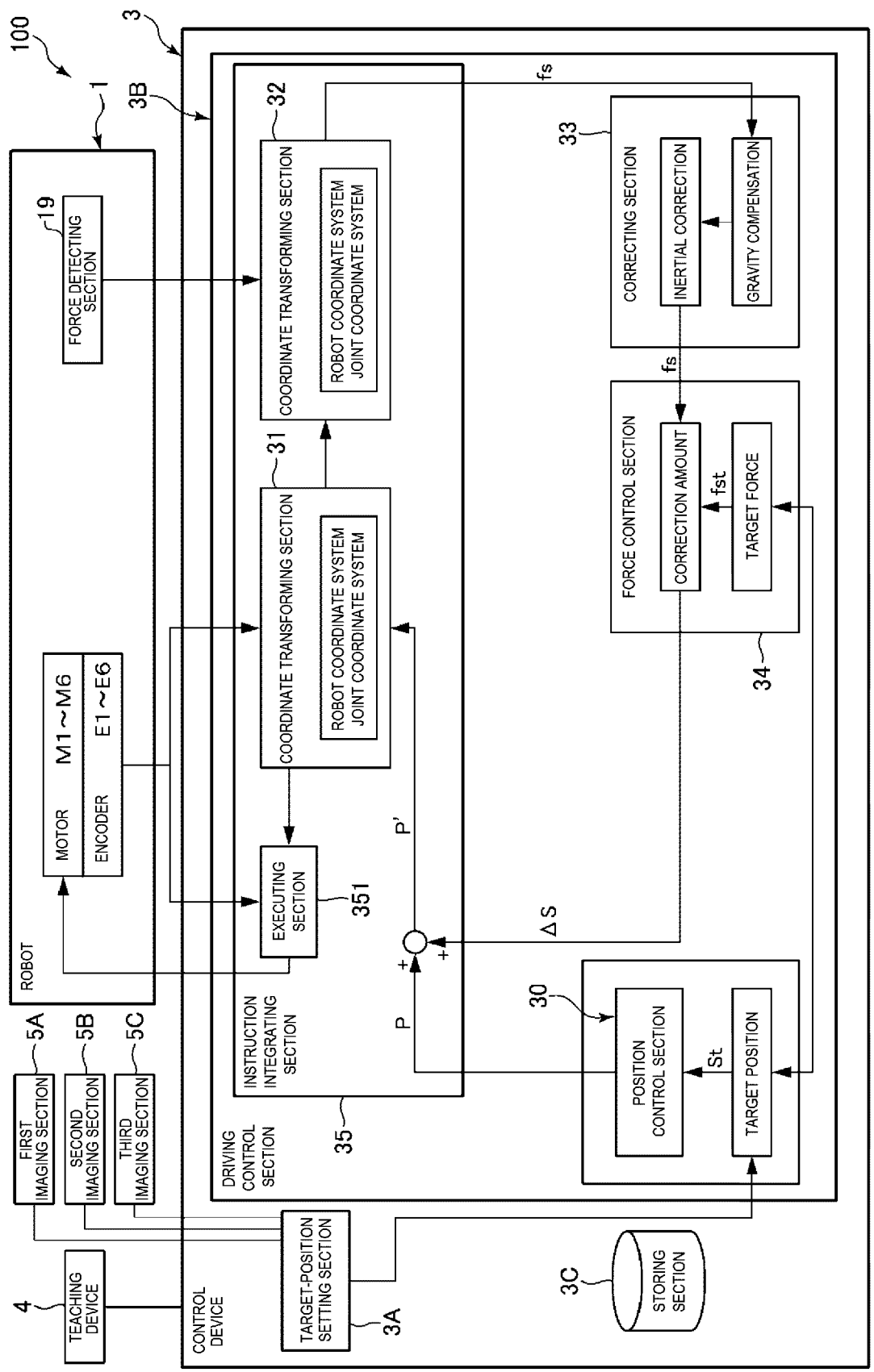
FIG. 2 is a block diagram of the robot system shown in FIG. 1.
Figure 3:
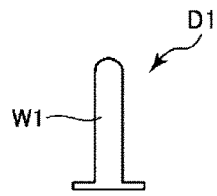
FIG. 3 is a diagram showing a first captured image captured by a first imaging section shown in FIG. 1.
Figure 4:
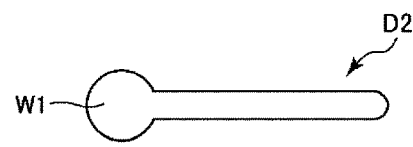
FIG. 4 is a diagram showing a second captured image captured by a second imaging section shown in FIG. 1.
Figure 5:
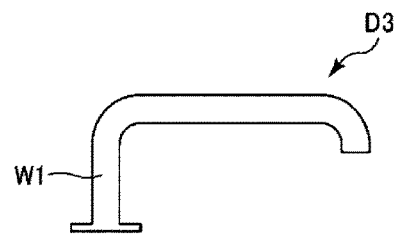
FIG. 5 is a diagram showing a third captured image captured by a third imaging section shown in FIG. 1.
Figure 6:
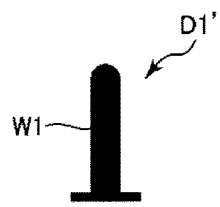
FIG. 6 is a diagram showing first projection shape data, which is data of a first projection shape.
Figure 7:
FIG. 7 is a diagram showing second projection shape data, which is data of a second projection shape.
Figure 8:
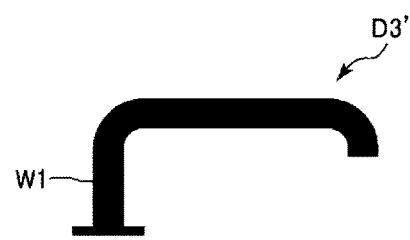
FIG. 8 is a diagram showing third projection shape data, which is data of a third projection shape.
Figure 9:
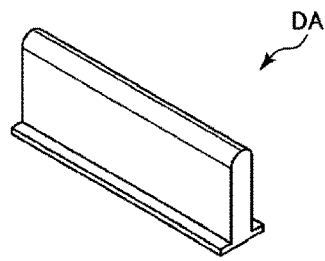
FIG. 9 is a diagram showing first predicted shape data predicted from the first projection shape data.
Figure 10:
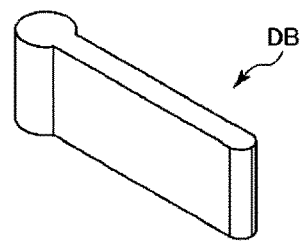
FIG. 10 is a diagram showing second predicted shape data predicted from the second projection shape data.
Figure 11:
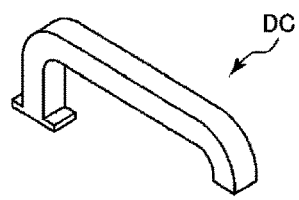
FIG. 11 is a diagram showing third predicted shape data predicted from the third projection shape data.
Figure 12:
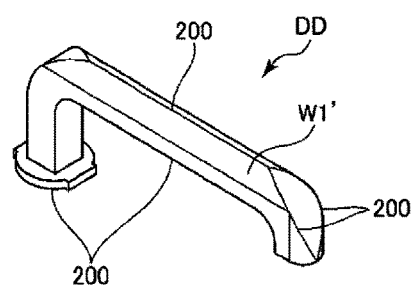
FIG. 12 is a diagram showing simple shape data, which is predicted three-dimensional shape of a workpiece.
Figure 13:
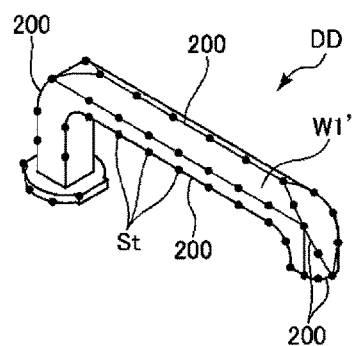
FIG. 13 is a diagram showing a state in which target positions are set in the predicted three-dimensional shape shown in FIG. 12.
Figure 14:
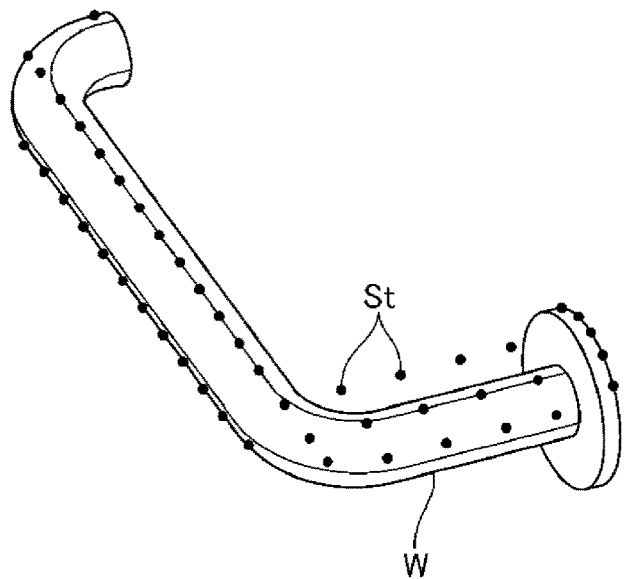
FIG. 14 is a diagram showing a state in which the target positions set in the predicted three-dimensional shape shown in FIG. 13 are applied to an actual work target object.
Figure 15:
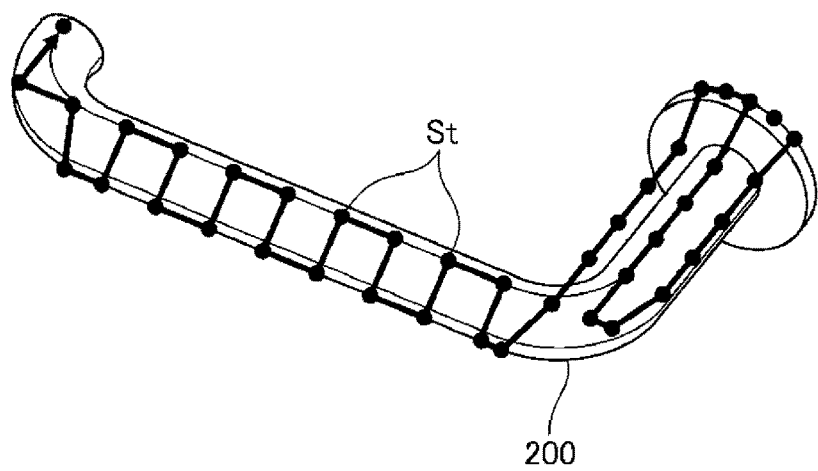
FIG. 15 is a diagram showing a state in which order in which a robot arm moves to the target positions set in the predicted three-dimensional shape shown in FIG. 13 is set.
Figure 16:
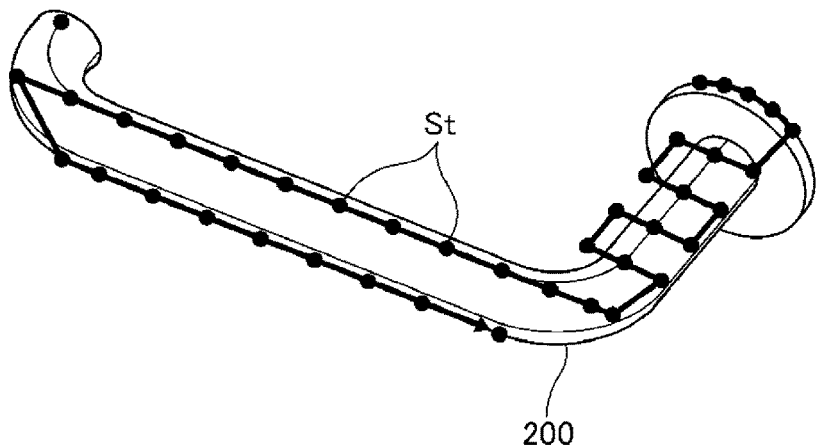
FIG. 16 is a diagram showing a state in which order in which the robot arm moves to the target positions set in the predicted three-dimensional shape shown in FIG. 13 is set.
Figure 17:
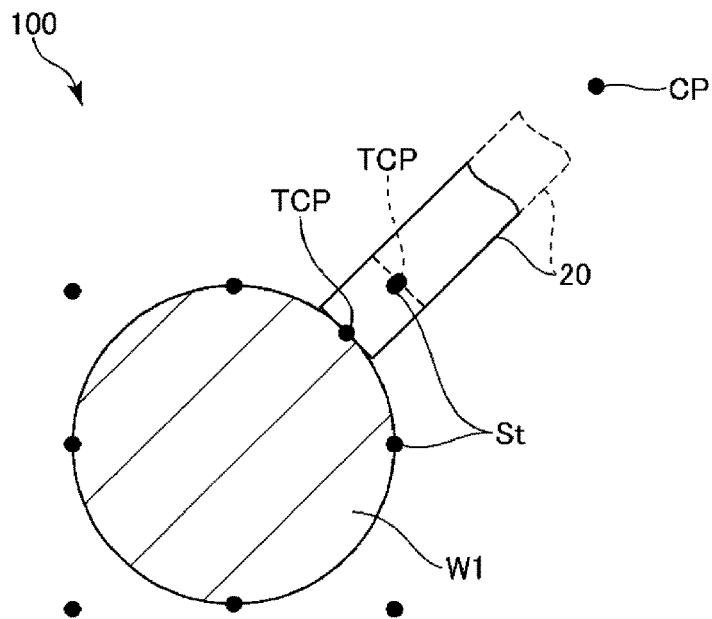
FIG. 17 is a sectional view showing a state in which the robot arm is performing predetermined work on the workpiece.
Figure 18:
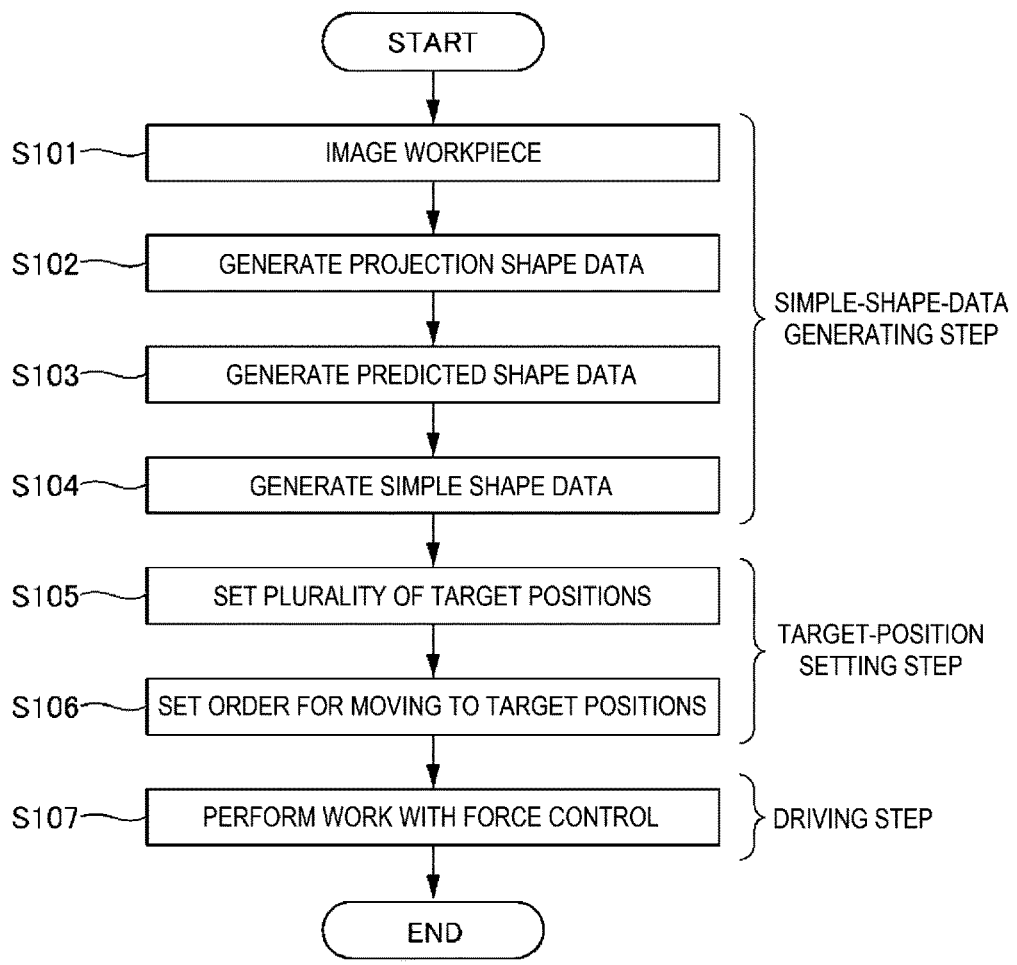
FIG. 18 is a flowchart for explaining a control operation performed by a control device shown in FIG. 2.

FIG. 1 is a diagram showing an overall configuration of a robot system in a first embodiment. FIG. 2 is a block diagram of the robot system shown in FIG. 1. FIG. 3 is a diagram showing a first captured image captured by a first imaging section shown in FIG. 1. FIG. 4 is a diagram showing a second captured image captured by a second imaging section shown in FIG. 1. FIG. 5 is a diagram showing a third captured image captured by a third imaging section shown in FIG. 1. FIG. 6 is a diagram showing first projection shape data, which is data of a first projection shape. FIG. 7 is a diagram showing second projection shape data, which is data of a second projection shape. FIG. 8 is a diagram showing third projection shape data, which is data of a third projection shape. FIG. 9 is a diagram showing first predicted shape data predicted from the first projection shape data. FIG. 10 is a diagram showing second predicted shape data predicted from the second projection shape data. FIG. 11 is a diagram showing third predicted shape data predicted from the third projection shape data. FIG. 12 is a diagram showing simple shape data, which is the predicted three-dimensional shape of a workpiece. FIG. 13 is a diagram showing a state in which target positions are set in the predicted three-dimensional shape shown in FIG. 12. FIG. 14 is a diagram showing a state in which the target positions set in the predicted three-dimensional shape shown in FIG. 13 are applied to an actual work target object. FIG. 15 is a diagram showing a state in which order in which the a robot arm moves to the target positions set in the predicted three-dimensional shape shown in FIG. 13 is set. FIG. 16 is a diagram showing a state in which order in which the robot arm moves to the target positions set in the predicted three-dimensional shape shown in FIG. 13 is set. FIG. 17 is a sectional view showing a state in which the robot arm is performing predetermined work on the workpiece. FIG. 18 is a flowchart for explaining a control operation performed by a control device shown in FIG. 2.

A robot control method and a robot system according to the present disclosure are explained in detail below based on preferred embodiments shown in the accompanying drawings. In the following explanation, for convenience of explanation, a +Z-axis direction, that is, the upper side in FIG. 1 is referred to as "upper" as well and a −Z-axis direction, that is, the lower side in FIG. 1 is referred to as "lower" as well. About a robot arm, a base 11 side in FIG. 1 is referred to as "proximal end" as well and the opposite side of the base 11 side, that is, an end effector 20 side is referred to as "distal end" as well. A Z-axis direction, that is, the up-down direction in FIG. 1 is represented as a "vertical direction" and an X-axis direction and a Y-axis direction, that is, the left-right direction in FIG. 1 is represented as a "horizontal direction".

As shown in FIG. 1, a robot system 100 includes a robot 1, a control device 3 that controls the robot 1, a teaching device 4, a first imaging section 5A, a second imaging section 5B, and a third imaging section 5C and executes the robot control method according to the present disclosure.

First, the robot 1 is explained.

The robot 1 shown in FIG. 1 is a single-arm six-axis vertical articulated robot in this embodiment and includes a base 11 and a robot arm 10. An end effector 20 can be attached to the distal end portion of the robot arm 10. The end effector 20 may be a constituent element of the robot 1 and may not be the constituent element of the robot 1.

The robot 1 is not limited to the configuration shown in FIG. 1 and may be, for example, a double-arm articulated robot. The robot 1 may be a horizontal articulated robot.

The base 11 is a supporting body that supports the robot arm 10 from the lower side to be able to be driven. The base 11 is fixed to, for example, a floor in a factory. In the robot 1, the base 11 is electrically coupled to the control device 3 via a relay cable 18. The coupling of the robot 1 and the control device 3 is not limited to coupling by wire as in the configuration shown in FIG. 1 and may be, for example, coupling by radio. Further, the robot 1 and the control device 3 may be coupled via a network such as the Internet.

In this embodiment, the robot arm 10 includes a first arm 12, a second arm 13, a third arm 14, a fourth arm 15, a fifth arm 16, and a sixth arm 17. These arms are coupled in this order from the base 11 side. The number of arms included in the robot arm 10 is not limited to six and may be, for example, one, two, three, four, five, or seven or more. The sizes such as the total lengths of the arms are not respectively particularly limited and can be set as appropriate.

The base 11 and the first arm 12 are coupled via a joint 171. The first arm 12 is capable of turning, with respect to the base 11, around a first turning axis parallel to the vertical direction with the first turning axis as a turning center. The first turning axis coincides with the normal of a floor to which the base 11 is fixed.

The first arm 12 and the second arm 13 are coupled via a joint 172. The second arm 13 is capable of turning with respect to the first arm 12 with a second turning axis parallel to the horizontal direction as a turning center. The second turning axis is parallel to an axis orthogonal to the first turning axis.

The second arm 13 and the third arm 14 are coupled via a joint 173. The third arm 14 is capable of turning with respect to the second arm 13 with a third turning axis parallel to the horizontal direction as a turning center. The third turning axis is parallel to the second turning axis.

The third arm 14 and the fourth arm 15 are coupled via a joint 174. The fourth arm 15 is capable of turning with respect to the third arm 14 with a fourth turning axis parallel to the center axis direction of the third arm 14 as a turning center. The fourth turning axis is orthogonal to the third turning axis.

The fourth arm 15 and the fifth arm 16 are coupled via a joint 175. The fifth arm 16 is capable of turning with respect to the fourth arm 15 with a fifth turning axis as a turning center. The fifth turning axis is orthogonal to the fourth turning axis.

The fifth arm 16 and the sixth arm 17 are coupled via a joint 176. The sixth arm 17 is capable of turning with respect to the fifth arm 16 with a sixth turning axis as a turning center. The sixth turning axis is orthogonal to the fifth turning axis.

The sixth arm 17 is a robot distal end portion located on the most distal end side in the robot arm 10. The sixth arm 17 can turn together with the end effector 20 according to the driving of the robot arm 10.

The robot 1 includes a motor M1, a motor M2, a motor M3, a motor M4, a motor M5, and a motor M6 functioning as driving sections and an encoder E1, an encoder E2, an encoder E3, an encoder E4, an encoder E5, and an encoder E6. The motor M1 is incorporated in the joint 171 and relatively rotates the base 11 and the first arm 12. The motor M2 is incorporated in the joint 172 and relatively rotates the first arm 12 and the second arm 13. The motor M3 is incorporated in the joint 173 and relatively rotates the second arm 13 and the third arm 14. The motor M4 is incorporated in the joint 174 and relatively rotates the third arm 14 and the fourth arm 15. The motor M5 is incorporated in the joint 175 and relatively rotates the fourth arm 15 and the fifth arm 16. The motor M6 is incorporated in the joint 176 and relatively rotates the fifth arm 16 and the sixth arm 17.

The encoder E1 is incorporated in the joint 171 and detects the position of the motor M1. The encoder E2 is incorporated in the joint 172 and detects the position of the motor M2. The encoder E3 is incorporated in the joint 173 and detects the position of the motor M3. The encoder E4 is incorporated in the joint 174 and detects the position of the motor M4. The encoder E5 is incorporated in the joint 175 and detects the position of the motor M5. The encoder E6 is incorporated in the joint 176 and detects the position of the motor M6.

The encoders E1 to E6 are electrically coupled to the control device 3. Position information, that is, rotation amounts of the motors M1 to M6 are transmitted to the control device 3 as electric signals. The control device 3 drives the motors M1 to M6 via not-shown motor drivers based on this information. That is, controlling the robot arm 10 means controlling the motors M1 to M6.

A control point CP is set at the distal end of the robot arm 10. The control point CP means a point serving as a reference in performing control of the robot arm 10. In the robot system 100, the position of the control point CP is grasped in a robot coordinate system. The robot arm 10 is driven such that the control point CP moves to a desired position.

In the robot 1, a force detecting section 19 that detects force is detachably set in the robot arm 10. The robot arm 10 can be driven in a state in which the force detecting section 19 is set. In this embodiment, the force detecting section 19 is a six-axis force sensor. The force detecting section 19 detects the magnitudes of forces on three detection axes orthogonal to one another and the magnitudes of torques around the three detection axes. That is, the force detecting section 19 detects force components in the axial directions of an X axis, a Y axis and a Z axis orthogonal to one another, a force component in a W direction around the X axis, a force component in a V direction around the Y axis, and a force component in a U direction around the Z axis. In this embodiment, the Z-axis direction is the vertical direction. The force components in the axial directions can also be referred to as "translational force components". The force components around the axes can also be referred to as "torque components". The force detecting section 19 is not limited to the six-axis force sensor and may be sensors having other configurations.

In this embodiment, the force detecting section 19 is set in the sixth arm 17. A setting part of the force detecting section 19 is not limited to the sixth arm 17, that is, an arm located on the most distal end side and may be, for example, another arm or a part between adjacent arms.

The end effector 20 can be detachably attached to the force detecting section 19. In this embodiment, the end effector 20 is a polisher that performs polishing of a workpiece W1, which is a work target object. The polisher includes a polishing member 21 including abrasive grains on the outer circumferential portion thereof, a not-shown motor that rotates the polishing member 21, and a not-shown power supply that drives the motor. In the robot coordinate system, a tool center point TCP is set in any position, preferably, the center of the distal end face of the polishing member 21. The tool center point TCP is not limited to this and may be set in the outer circumferential portion of the polishing member 21.

As explained above, in the robot system 100, the robot arm 10 is drive such that the position of the control point CP is grasped in the robot coordinate system and the control point CP moves to a desired position. By grasping a type, in particular, the length of the end effector 20 in advance, it is possible to grasp an offset amount between the tool center point TCP and the control point CP. Accordingly, the position of the tool center point TCP can be grasped in the robot coordinate system. Therefore, the tool center point TCP can be set as a reference of control.

In this embodiment, the end effector 20 is configured by the polisher. However, in the present disclosure, the end effector 20 is not limited to this and may be a grinder, a cutter, or the like or a tool such as a driver or a wrench or may be a hand that grips the workpiece W1 with suction or holding. As in a second embodiment, the end effector 20 may be a spray that jets treatment liquid or may be a brush or the like for applying the treatment liquid.

In this embodiment, as shown in FIG. 1, the workpiece W1 is explained as a member configured by a long body, the cross sectional shape of which is a circle, and bends in two places halfway in the longitudinal direction thereof.

The first to third imaging sections 5A to 5C are explained. The first to third imaging sections 5A to 5C have the same configuration except that setting positions and directions are different. The first to third imaging sections 5A to 5C can be configured to include, for example, an imaging element configured by a CCD (Charge Coupled Device) image sensor including a plurality of pixels and an optical system including a lens. As shown in FIG. 2, the first to third imaging sections 5A to 5C are electrically coupled to a target-position setting section 3A of the control device 3. The first to third imaging sections 5A to 5C convert light received by the imaging element into an electric signal and output the electric signal to the target-position setting section 3A. The target-position setting section 3A converts the electric signal into image data and temporarily stores the image data in a storing section 3C. In the following explanation, image data based on an electric signal output from the first imaging section 5A is referred to as first captured image D1, image data based on an electric signal output from the second imaging section 5B is referred to as second captured image D2, and image data based on an electric signal output from the third imaging section 5C is referred to as third captured image D3.

As shown in FIG. 1, the first imaging section 5A images the workpiece W1 from a +X-axis side, the second imaging section 5B images the workpiece W1 from a +Y-axis side, and the third imaging section 5C images the workpiece W1 from a +Z-axis side. The first to third imaging sections 5A to 5C perform imaging before the robot 1 performs predetermined action on the workpiece W1. The target-position setting section 3A sets an operation route of the robot arm 10 based on the obtained first to third captured images D1 to D3. This is explained in detail below.

In this embodiment, the robot system 100 includes the three imaging sections, that is, the first to third imaging sections 5A to 5C. However, in the present disclosure, the robot system 100 is not limited to this. One to three of the first to third imaging sections 5A to 5C may be omitted. When the robot system 100 includes one or two imaging sections, it is preferable to perform imaging from a plurality of directions while moving the imaging sections. When the imaging sections are omitted, for example, by inputting three-dimensional data, for example, CAD data of the workpiece W1 to the control device 3 or the teaching device 4, an operation route of the robot arm 10 can be set.

The control device 3 and the teaching device 4 are explained.

The control device 3 is disposed to be separated from the robot 1. The control device 3 can be configured by a computer or the like incorporating a CPU (Central Processing Unit), which is an example of a processor. The control device 3 may be incorporated in the base 11 of the robot 1.

The control device 3 is communicably coupled to the robot 1 by the relay cable 18. The control device 3 is coupled to the teaching device 4 by a cable or wirelessly communicably coupled to the teaching device 4. The teaching device 4 may be a dedicated computer or may be a general-purpose computer in which a program for teaching the robot 1 is installed. For example, a teaching pendant, which is a dedicated device for teaching the robot 1, may be used instead of the teaching device 4. Further, the control device 3 and the teaching device 4 may include separate housings or may be integrally configured.

A program for generating an execution program, which has target positions $S_t$ and a target force $f_{St}$ explained below as arguments, and loading the execution program to the control device 3 may be installed in the teaching device 4. The teaching device 4 includes a display 41, a processor, a RAM, and a ROM. These hardware resources generate the execution program in cooperation with the teaching program.

As shown in FIG. 2, the control device 3 is a computer in which a control program for performing control of the robot 1 is installed. The control device 3 includes a processor and a RAM and a ROM not shown in FIG. 2. These hardware resources control the robot 1 in cooperation with the control program.

As shown in FIG. 2, the control device 3 includes a target-position setting section 3A, a driving control section 3B, and a storing section 3C. The storing section 3C is configured by, for example, a volatile memory such as a RAM (Random Access Memory), a nonvolatile memory such as a ROM (Read Only Memory), or a detachable external storage device. In the storing section 3C, an operation program for causing the robot 1 to operate such as a program for executing the robot control method according to the present disclosure is stored.

The target-position setting section 3A sets target positions $S_t$ and an operation route for executing predetermined work on the workpiece W1. This is specifically explained below.

First, the target-position setting section 3A acquires the first captured image D1 shown in FIG. 3 from the first imaging section 5A, acquires the second captured image D2 shown in FIG. 4 from the second imaging section 5B, and acquires the third captured image D3 shown in FIG. 5 from the third imaging section 5C.

Subsequently, the target-position setting section 3A performs binarization processing on the first captured image D1 and, as shown in FIG. 6, generates first projection shape data D1', which is data of a first projection shape of the workpiece W1. Similarly, as shown in FIG. 7, the target-position setting section 3A generates second projection shape data D2', which is data of a second projection shape of the workpiece W1, from the second captured image D2. As shown in FIG. 8, the target-position setting section 3A generates third projection shape data D3', which is data of a third projection shape of the workpiece W1, from the third captured image D3.

Subsequently, the target-position setting section 3A predicts a shape of the workpiece W1 and generates first predicted shape data DA from the first projection shape data D1'. Specifically, the target-position setting section 3A generates the first predicted shape data DA of a long first three-dimensional shape having a predetermined length, a cross sectional shape of which is the same shape as the first projection shape in the first projection shape data D1'. Similarly, as shown in FIG. 10, the target-position setting section 3A generates second predicted shape data DB having a second three-dimensional shape from the second projection shape data D2'. As shown in FIG. 11, the target-position setting section 3A generates third predicted shape data DC having a third three-dimensional shape from the third projection shape data D3'.

Subsequently, the target-position setting section 3A generates, based on, that is, by combining the first to third predicted shape data DA to DC, simple shape data DD, which is data of a predicted three-dimensional shape W' of the workpiece W1 as shown in FIG. 12. The predicted three-dimensional shape W' in the simple shape data DD is relatively rough data in which portions of curved surfaces are fewer than those in the actual workpiece W1 and the number of ridge lines 200 is larger than that in the actual workpiece W1. In this way, the target-position setting section 3A generates the simple shape data DD based on the first to third captured images D1 to D3. However, the target-position setting section 3A is not limited to this configuration. The first to fifth imaging sections 5A to 5C may be omitted. The target-position setting section 3A may generate the simple shape data DD from three-dimensional shape data such as CAD data of the workpiece W1.

In the above explanation, the target-position setting section 3A generates the simple shape data DD. However, in the present disclosure, the simple shape data DD is not limited to this. For example, the simple shape data DD generated by the teaching device 4 or another external device may be input to the control device 3.

As shown in FIG. 13, the target-position setting section 3A sets a plurality of target positions $S_t$ in the predicted three-dimensional shape W' in the simple shape data DD. In this specification, "set the target positions $S_t$" means storing, in the storing section 3C, position information of the target positions $S_t$ with respect to the predicted three-dimensional shape W'.

In this embodiment, the target positions $S_t$ are set at a predetermined interval on the ridge lines 200 of the predicted three-dimensional shape W'. The ridge lines 200 of the predicted three-dimensional shape W' are characteristic portions obtained by simplifying the shape of the workpiece W1. By setting the plurality of target positions $S_t$ on the ridge lines 200, it is possible to set the target positions $S_t$ in portions obtained by simplifying the shape of the workpiece W1 and achieve simplification of the setting of the target positions $S_t$. The ridge lines 200 correspond to contour portions in projection shapes. By setting the plurality of target positions $S_t$ on such ridge lines 200, it is possible to set the target positions $S_t$ without unevenness as a whole.

In the predicted three-dimensional shape W', the target positions $S_t$ may be set in portions other than the ridge lines 200. A setting frequency of the target positions $S_t$ may be changed according to the shapes of the ridge lines 200. For example, an interval of the target positions $S_t$ in the ridge lines 200 having a bending shape may be set relatively small and an interval of the target positions $S_t$ in the ridge lines 200 having a linear shape may be set relatively large.

Subsequently, as shown in FIG. 14, the target-position setting section 3A applies the target positions $S_t$ set as explained above to the actual workpiece W1. Specifically, while maintaining a positional relation among the target positions $S_t$ shown in FIG. 13, the target-position setting section 3A sets the target positions $S_t$ in the actual workpiece W1 based on the first to third captured images D1 to D3 shown in FIGS. 3 to 5. Further, in other words, the target-position setting section 3A sets coordinates in the robot coordinate system for the target positions $S_t$ based on a position where the workpiece W1 is actually placed. The target-position setting section 3A sets the coordinates and, at the same time, sets postures of the robot arm 10 approaching the target positions $S_t$.

Subsequently, as shown in FIGS. 15 and 16, order in which the control point CP or the tool center point TCP of the robot arm 10 moves to the target positions $S_t$ is set. That is, an operation route of the robot arm 10 is set. "The control point CP or the tool center point TCP of the robot arm 10 moves to the target positions $S_t$" means that the control point CP or the tool center point TCP moves with the target positions $S_t$ as targets, although not moving until coinciding with the target positions $S_t$.

When the order is set for the target positions $S_t$, the postures of the robot arm 10 approaching the target positions $S_t$ are also set. That is, when the order is set for the target positions $S_t$, a direction from which the robot arm 10 approaches and a posture in which the robot arm 10 approaches are linked with each of the target positions $S_t$ and stored in the storing section 3C.

With the target-position setting section 3A explained above, it is possible to set the plurality of target positions $S_t$ for the predicted three-dimensional shape W', which is a relatively simple structure. Consequently, for example, the number of target positions $S_t$ can be reduced more than the method disclosed in JP-A-7-100755. Accordingly, it is possible to set the target positions $S_t$ more simply and quickly than in related art.

However, as shown in FIGS. 14 to 16, some of the set target positions $S_t$ are located in places away from the surface of the workpiece W1. In this case, when work is simply performed while driving the robot arm 10 such that the tool center point TCP passes the target positions $S_t$, the end effector 20 sometimes does not come into contact with the workpiece W1. In this case, satisfactory work cannot be performed. Therefore, in the robot system 100, the driving control section 3B can solve this problem by performing control explained below. The driving control section 3B is explained below.

The driving control section 3B controls driving of the robot arm 10. The driving control section 3B includes a position control section 30, a coordinate transforming section 31, a coordinate transforming section 32, a correcting section 33, a force control section 34, and an instruction integrating section 35.

The position control section 30 generates, according to a target position designated by a command created in advance, a position instruction signal, that is, a position instruction value for controlling the position of the tool center point TCP of the robot 1.

The control device 3 is capable of controlling the operation of the robot 1 with force control or the like. The "force control" means control of the operation of the robot 1 for changing, based on a detection result of the force detecting section 19, the position of the end effector 20, that is, the position of the tool center point TCP and the postures of the first to sixth arms 12 to 17.

The force control includes, for example, force trigger control and impedance control. In the force trigger control, the control device 3 performs force detection with the force detecting section 19 and causes the robot arm 10 to move and change a posture until predetermined force is detected by the force detecting section 19.

The impedance control includes tracer control. First, to explain briefly, in the impedance control, the control device 3 controls the operation of the robot arm 10 to maintain force applied to the distal end portion of the robot arm 10 at predetermined force as much as possible, that is, maintain force in a predetermined direction detected by the force detecting section 19 at the target force $f_{St}$ as much as possible. Consequently, for example, when the control device 3 performs the impedance control on the robot arm 10, the robot arm 10 performs operation for tracing, in the predetermined direction, external force applied from a target object or an operator. The target force $f_{St}$ includes 0 as well. For example, in the case of the tracing operation, a target value can be set to "0". The target force $f_{St}$ can be set to a numerical value other than 0. The operator is capable of setting the target force $f_{St}$ as appropriate.

The storing section 3C has stored therein a correspondence relation between combinations of rotation angles of the motors M1 to M6 and the positions of the tool center point TCP in the robot coordinate system. The control device 3 stores, for each of processes of work performed by the robot 1, at least one of the target position $S_t$ and the target force $f_{St}$ in the storing section 3C based on a command. A command having the target position $S_t$ and the target force $f_{St}$ as arguments, that is, parameters is set for each of the processes of the work performed by the robot 1.

The driving control section 3B controls the first to sixth arms 12 to 17 based on the command such that the set target position $S_t$ and the set target force $f_{St}$ are matched in the tool center point TCP. The target force $f_{St}$ is force that should be detected by the force detecting section 19 according to the operations of the first to sixth arms 12 to 17. It is assumed that the character "S" represents any one direction of directions (X, Y, Z, U, V, and W) of axes specifying the robot coordinate system. It is assumed that S represents the position in an S direction as well. For example, in the case of S=X, an X-direction component of a target position set in the robot coordinate system is $S_t$=$X_t$ and an X-direction component of a target force is $f_{St}$=$f_{Xt}$.

In the driving control section 3B, when rotation angles of the motors M1 to M6 are acquired, the coordinate transforming section 31 shown in FIG. 2 transforms, based on the correspondence relation, the rotation angles into the position S (X, Y, Z, V, W, and U) of the tool center point TCP in the robot coordinate system. The coordinate transforming section 32 specifies, based on the position S of the tool center point TCP and a detection value of the force detecting section 19, in the robot coordinate system, an acting force $f_S$ actually acting on the force detecting section 19.

A point of action of the acting force $f_S$ is defined as an origin separately from the tool center point TCP. The origin corresponds to a point where the force detecting section 19 detects force. The control device 3 stores, for each position S of the tool center point TCP in the robot coordinate system, a correspondence relation specifying a direction of a detection axis in a sensor coordinate system of the force detecting section 19. Therefore, the control device 3 can specify the acting force $f_S$ in the robot coordinate system based on the position S of the tool center point TCP in the robot coordinate system and the correspondence relation. Torque acting on the robot can be calculated from the acting force $f_S$ and the distance from a contact point to the force detecting section 19 and is specified as a torque component. When the end effector 20 comes into contact with the workpiece W1 and performs work, the contact point can be regarded as the tool center point TCP.

The correcting section 33 performs gravity compensation for the acting force $f_S$. The gravity compensation means removing components of force and torque due to the gravity from the acting force $f_S$. The acting force $f_S$ for which the gravity compensation is performed can be regarded as force other than the gravity acting on the robot arm 10 or the end effector 20.

The correcting section 33 performs inertia compensation for the acting force $f_S$. The inertia compensation means removing components of force and torque due to an inertial force from the acting force $f_S$. The acting force $f_S$ for which the inertia compensation is performed can be regarded as force other than the inertial force acting on the robot arm 10 or the end effector 20.

The force control section 34 performs the impedance control. The impedance control is active impedance control for realizing virtual mechanical impedance with the motors M1 to M6. The control device 3 executes such impedance control when performing processes in a contact state in which the end effector 20 receives force from a workpiece, which is a target object, such as fitting work, screwing work, and polishing work for the workpiece and the direct teaching. In processes other than such processes, safety can be improved by, for example, performing the impedance control when a person touches the robot 1.

In the impedance control, the target force $f_{St}$ is substituted in an equation of motion explained below to derive rotation angles of the motors M1 to M6. Signals for the control device 3 to control the motors M1 to M6 are PWM (Pulse Width Modulation)-modulated signals.

In a process in a non-contact state in which the end effector 20 does not receive external force, the control device 3 controls the motors M1 to M6 at rotation angles derived by a linear arithmetic operation from the target positions $S_t$. A mode for controlling the motors M1 to M6 at the rotation angles derived by the linear arithmetic operation from the target positions $S_t$ is referred to as position control mode.

The control device 3 specifies a force-derived correction amount ΔS by substituting the target force $f_{St}$ and the acting force $f_S$ in the equation of motion of the impedance control. The force-derived correction amount ΔS means the size of a position S to which the tool center point TCP should move in order to eliminate a force deviation $\Delta f_S(t)$ from the target force $f_{St}$ when the tool center point TCP receives mechanical impedance. The following Expression (1) is the equation of motion of the impedance control.

$$m\Delta\ddot{S}(t)+d\Delta\dot{S}(t)+k\Delta S(t)=\Delta f_S(t) \quad (1)$$

The left side of Expression (1) is formed by a first term obtained by multiplying a second-order differential value of the position S of the tool center point TCP by a virtual mass coefficient m (hereinafter, referred to as "mass coefficient m"), a second term obtained by multiplying a differential value of the position S of the tool center point TCP by a virtual viscosity coefficient d (hereinafter referred to as "viscosity coefficient d"), and a third term obtained by multiplying the position S of the tool center point TCP by a virtual modulus of elasticity k (hereinafter referred to as "modulus of elasticity k"). The right side of Expression (1) is formed by the force deviation $\Delta f_S(t)$ obtained by subtracting an actual force f from the target force $f_{St}$. Differential in Expression (1) means differential by time. In the process performed by the robot 1, a fixed value is set as the target force $f_{St}$ in some cases and a function of time is set as the target force $f_{St}$ in other cases.

The mass coefficient m means mass that the tool center point TCP virtually has. The viscosity coefficient d means viscosity resistance that the tool center point TCP virtually receives. The modulus of elasticity k means a spring constant of an elastic force that the tool center point TCP virtually receives.

As a value of the mass coefficient m increases, acceleration of a motion decreases. As the value of the mass coefficient m decreases, the acceleration of the motion increases. As a value of the viscosity coefficient d increases, the speed of the motion decreases. As the value of the viscosity coefficient d decreases, the speed of the motion increases. As a value of the modulus of elasticity k increases, a spring property increases. As the value of the modulus of elasticity k decreases, the spring property decreases.

In this specification, each of the mass coefficient m, the viscosity coefficient d, and the modulus of elasticity k is referred to as force control parameter. The mass coefficient m, the viscosity coefficient d, and the modulus of elasticity k may be set to different values for each of directions or may be set to common values irrespective of the directions. The operator can set the mass coefficient m, the viscosity coefficient d, and the modulus of elasticity k as appropriate before work.

As explained above, in the robot system 100, a correction amount is calculated from the detection value of the force detecting section 19, the force control parameters set in advance, and the target force set in advance. The correction amount means the force-derived correction amount ΔS and means a difference between a position where external force is received and a position to which the tool center point TCP should be moved.

The instruction integrating section 35 adds the force-derived correction amount ΔS to a position instruction value P generated by the position control section 30. By performing this addition at any time, the instruction integrating section 35 calculates a new position instruction value P' from the position instruction value P used for moving the tool center point TCP to the portion where the external force is received.

The coordinate transforming section 31 transforms the new position instruction value P' into a robot coordinate. An executing section 351 executes the new position instruction value P'. Consequently, it is possible to move the tool center point TCP to a position taking into account the force-derived correction amount ΔS, relax a shock of the applied external force, and prevent a more load from being applied to a target object that comes into contact with the robot 1.

With such a driving control section 3B, it is possible to drive the robot arm 10 while moving the tool center point TCP toward the target position $S_t$ such that the tool center point TCP moves until the target force $f_{St}$ reaches a value set in advance. In other words, for example, as shown in FIG. 17, even if the tool center point TCP is moved toward the target position $S_t$ from a direction set in advance and the tool center point TCP coincides with the target position $S_t$ as indicated by an alternate long and two short dashes line in FIG. 17, if the end effector 20 is not in contact with the workpiece W1, the robot arm 10 is driven such that the tool center point TCP further moves on an extension in a direction in which the tool center point TCP moves to that point. The robot arm 10 is driven such that, as indicated by a solid line in FIG. 17, the end effector 20 comes into contact with the workpiece W1 and the target force $f_{St}$ reaches the value set in advance. Such control is executed in each of the target positions $S_t$.

With such a configuration, even if the target position $S_t$ set by the target-position setting section 3A is located in a place apart from the surface of the workpiece W1, it is possible to bring the end effector 20 into contact with the workpiece W1 and satisfactorily perform predetermined work according to the force control explained above. In other words, in the robot system 100, the target-position setting section 3A quickly sets the target positions $S_t$ and an operation route and the driving control section 3B drives the robot arm 10 with the force control. Consequently, it is possible to supplement roughness of the target-position setting section 3A, which performs the quick route setting, with highly accurate driving of the robot arm 10 by the driving control section 3B. As a result, it is possible to achieve both of the quick setting of the target positions $S_t$ and accuracy of work on the workpiece W1.

As explained above, the robot system 100 includes the robot arm 10 that performs predetermined work on the workpiece W1, which is the work target object, the force detecting section 19 that detects force applied to the robot arm 10, the target-position setting section 3A that sets, on the simple shape data DD predicted from a plurality of projection shapes obtained by projecting the workpiece W1 from the different positions, a plurality of target positions $S_t$ to which the control point CP of the robot arm 10 in performing the predetermined work is moved, and the driving control section 3B that drives the robot arm 10 with the force control based on the plurality of target positions $S_t$ set by the target-position setting section 3A and the force applied to the robot arm 10 and performs the predetermined work. Consequently, the target-position setting section 3A can quickly and easily set the target positions $S_t$. The driving control section 3B drives the robot arm 10 with the force control. Consequently, it is possible to supplement the roughness of the target-position setting section 3A, which performs the quick setting of the target positions $S_t$, with the force control performed by the driving control section 3B. As a result, it is possible to achieve both of the quick setting of the target positions $S_t$ and accuracy of the work on the workpiece W1.

An example of an operation program executed by the control device 3, that is, an example of the robot control method according to the present disclosure is explained based on the flowchart of FIG. 18.

Steps S101 to S104 are a simple-shape-data generating step. Steps S105 and S106 are a target-position setting step. Step S107 is a driving step.

First, in step S101, the control device 3 images the workpiece W1 using the first to third imaging sections 5A to 5C. Consequently, as shown in FIGS. 3 to 5, it is possible to obtain the first to third captured images D1 to D3 obtained by imaging the workpiece W1 from different directions.

Subsequently, in step S102, the control device 3 generates at least two, in this embodiment, three projection shape data. That is, the control device 3 performs binarization processing on the first to third captured images D1 to D3 and, as shown in FIGS. 6 to 8, generates first to third projection shape data D1' to D3'.

Subsequently, in step S103, the control device 3 generates predicted shape data. That is, as shown in FIGS. 9 to 11, the control device 3 generates first to third predicted shape data DA to DC from the first to third projection shape data D1' to D3'. A method for the generation is as explained above.

Subsequently, in step S104, the control device 3 generates simple shape data DD, which is a predicted three-dimensional shape of the workpiece W1. That is, the control device 3 combines the first to third predicted shape data DA to DC and, as shown in FIG. 12, generates the simple shape data DD, which is the predicted three-dimensional shape W' of the workpiece W1. The predicted three-dimensional shape W' in the simple shape data DD is relatively rough data in which portions of curved surfaces are fewer than those in the actual workpiece W1 and the number of ridge lines 200 is larger than that in the actual workpiece W1.

Steps S101 to S104 explained above are the simple-shape-data generating step. In this way, the robot control method further includes, before the target-position setting step, the simple-shape-data generating step for generating simple shape data. Consequently, even when simple shape data is absent, it is possible to generate simple shape data and shift to the target-position setting step.

In the simple-shape-data generating step, it is preferable to generate the simple shape data DD from a projection shape having the largest projection area and a projection shape having the second largest projection area among a plurality of projection shapes obtained by projecting the workpiece W1, which is the work target object, from different directions. By selecting projection shapes having large projection areas from projection shapes from a plurality of directions and generating the simple shape data DD based on the projection shapes, it is possible to bring the shape of the simple shape data DD closer to the actual workpiece W1.

In the simple-shape-data generating step, the control device 3 images the workpiece W1, which is the work target object, using the first to third imaging sections 5A to 5C, which are the imaging sections, acquires the first to third captured images D1 to D3, which are the captured images, and acquires the first to third projection shape data D1' to D3', which are the data of the projection shapes, based on the first to third captured images D1 to D3. Consequently, for example, even when three-dimensional shape data of the workpiece W1 is absent, it is possible to generate simple shape data and shift to the target-position setting step.

Subsequently, in step S105, the control device 3 sets the target positions $S_t$. That is, as shown in FIG. 13, the control device 3 sets a plurality of target positions $S_t$ at a predetermine interval on the ridge lines 200 of the predicted three-dimensional shape W'. In this way, in the target-position setting step, the control device 3 sets the plurality of target positions $S_t$ at the predetermined interval on the ridge lines 200 of the simple shape data DD. The ridge lines 200 are characteristic portions obtained by simplifying the shape of the workpiece W1. By setting the plurality of target positions $S_t$ on the ridge lines 200, it is possible to set the target positions $S_t$ in portions obtained by simplifying the shape of the workpiece W1 and achieve simplification of the setting of the target positions $S_t$. The ridge lines 200 correspond to contour portions in the projection shapes. By setting the plurality of target positions $S_t$ on such ridge lines 200, it is possible to set the target positions $S_t$ without unevenness as a whole.

Subsequently, in step S106, the control device 3 sets order for moving to the target positions $S_t$. In this step, the control device 3 sets order for each of the target positions $S_t$. In FIGS. 15 and 16, the target positions $S_t$ are coupled by arrows according to the order. Examples of a method of setting order include a method of setting order such that the target positions $S_t$ gradually separate from a position closest to the tool center point TCP. When setting the order for moving to the target positions $S_t$, the control device 3 also sets postures of the robot arm 10 approaching the target positions $S_t$.

With such a target-position setting step, it is possible to set the target positions $S_t$ in the simple shape data DD. By setting the order for moving to the target positions $S_t$, it is possible to set an operation route of the robot arm 10.

In step S107, as explained above, the control device 3 performs work with the force control. That is, the control device 3 drives the robot arm 10 with the force control based on the target positions $S_t$ set in the target-position setting step and the force applied to the robot arm 10 and performs the predetermined work.

As explained above, the robot control method is the robot control method for controlling the robot 1 including the robot arm 10 that performs predetermined work on the workpiece W1, which is the work target object. The robot control method includes the target-position setting step for setting, on the simple shape data DD predicted from a plurality of projection shapes obtained by projecting the workpiece W1 from different directions, a plurality of target positions $S_t$ to which the control point CP of the robot arm 10 in performing the predetermined work is moved and the driving step for driving the robot arm 10 with force control based on the plurality of target positions $S_t$ set in the target-position setting step and force applied to the robot arm 10 and performing the predetermined work. Consequently, it is possible to quickly and easily set the target positions $S_t$ in the target-position setting step. By driving the robot arm 10 with the force control in the driving step, it is possible to supplement roughness of the target-position setting section 3A, which performs the quick setting of the target positions $S_t$, with the force control performed by the driving control section 3B. As a result, it is possible to achieve both of the quick setting of the target positions $S_t$ and accuracy of the work on the workpiece W1.

Second Embodiment

Figure 19:
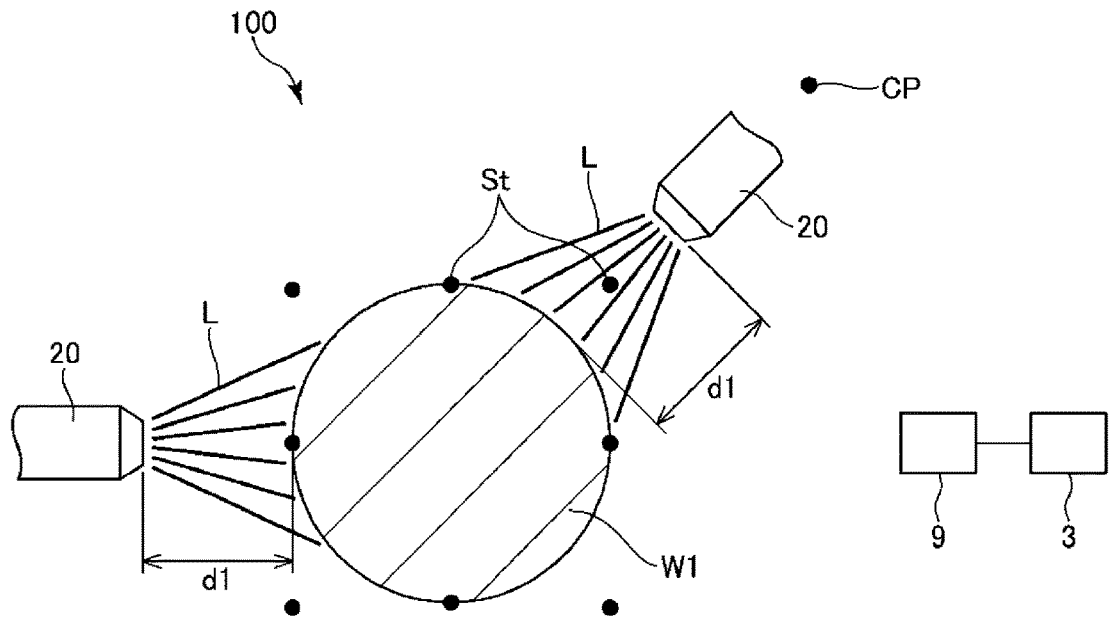
FIG. 19 is a sectional view showing a state in which a robot arm included in a robot system in a second embodiment is performing predetermined work on a workpiece.
Figure 20:
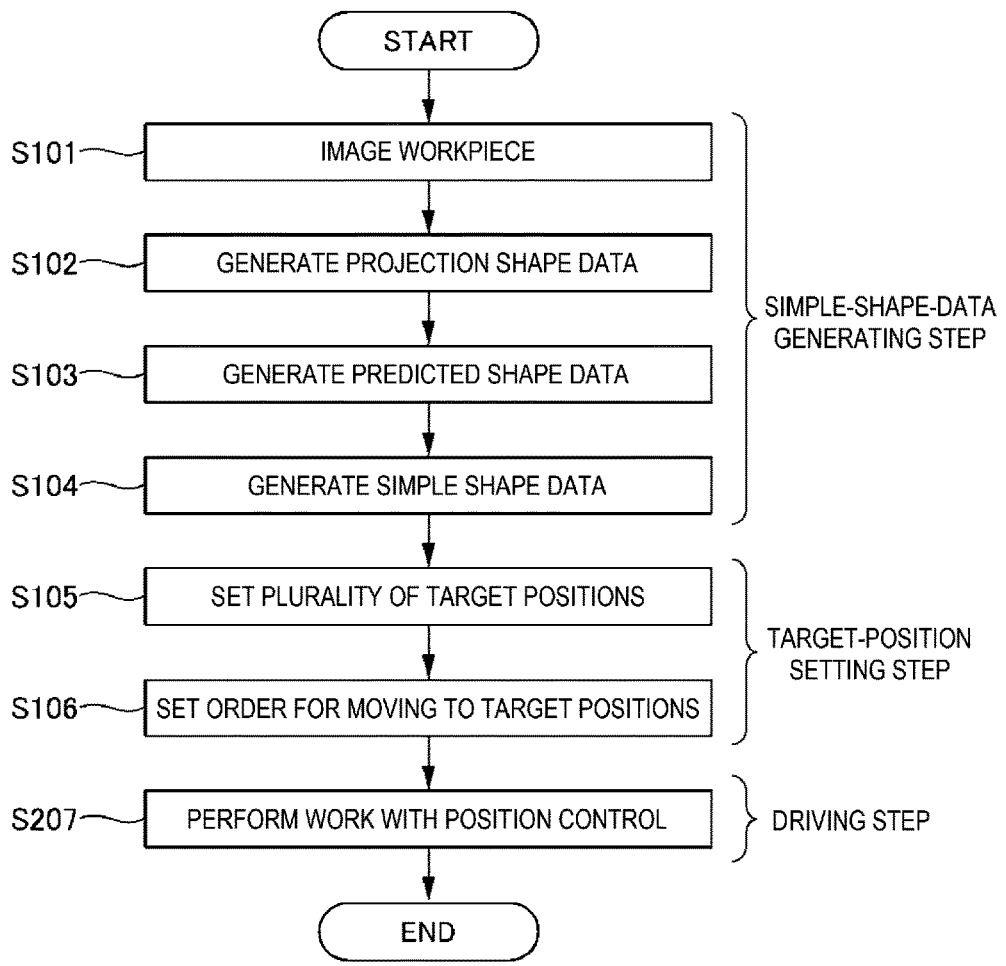
FIG. 20 is a flowchart for explaining a control operation performed by a control device included in the robot system shown in FIG. 19.

FIG. 19 is a sectional view showing a state in which a robot arm included in a robot system in a second embodiment is performing predetermined work on a workpiece. FIG. 20 is a flowchart for explaining a control operation performed by a control device included in the robot system shown in FIG. 19.

The second embodiment of the robot control method and the robot system according to the present disclosure are explained below with reference to FIGS. 19 and 20. Differences from the first embodiment are mainly explained. Explanation about similarities to the first embodiment is omitted.

As shown in FIG. 19, in this embodiment, the end effector 20 is configured by an jetting section that jets treatment liquid L to the workpiece W1. The treatment liquid L is not particularly limited. Examples of the treatment liquid L include water, disinfection liquid, an adhesive, and a coating agent.

In this embodiment, the robot 1 includes a distance detecting section 9 that detects a separation distance d1 between the robot arm 10 and the workpiece W1. The distance detecting section 9 is not particularly limited. Examples of the distance detecting section 9 include a camera, an optical sensor, and a capacitance sensor. A setting position of the distance detecting section 9 is not particularly limited. The distance detecting section 9 may be set in any position of the robot arm 10 and may be set in a position other than the robot arm 10, for example, on a workbench.

Although not shown in FIG. 19, the distance detecting section 9 is electrically coupled to the control device 3. Information concerning the separation distance d1 between the robot arm 10 and the workpiece W1 detected by the distance detecting section 9 is transmitted to the control device 3 as an electric signal.

The robot control method in this embodiment is explained based on the flowchart of FIG. 20. This embodiment is the same as the first embodiment except that a driving step is different. That is, in this embodiment, step S207, which is the driving step, is executed instead of step S107 in the first embodiment.

In step S207, the control device 3 detects the separation distance d1 between the robot arm 10 and the workpiece W1 using the distance detecting section 9 while moving the tool center point TCP toward the target position $S_t$. The movement of the tool center point TCP is performed until the separation distance d1 between the robot arm 10 and the workpiece W1 reaches a value set in advance, that is, a predetermined value.

For example, as shown in FIG. 19, the control device 3 moves the tool center point TCP toward the target position $S_t$ from a direction set in advance. Even if the tool center point TCP does not reach the target position $S_t$, when the separation distance d1 between the robot arm 10 and the workpiece W1 reaches the predetermined value, the control device 3 stops the movement of the robot arm 10 and performs work, that is, jets the treatment liquid L. The control device 3 performs such control for each of the target positions $S_t$.

According to this embodiment, as in the first embodiment, it is possible to quickly and easily set the target positions $S_t$ in the target-position setting step. In the driving step, while detecting the separation distance d1 between the robot arm 10 and the workpiece W1, the control device 3 drives the robot arm 10 such that the separation distance d1 reaches the predetermined value. Consequently, even if the target positions $S_t$ are separated from the surface of the workpiece W1, it is possible to keep the separation distance d1 between the robot arm 10 and the workpiece W1 at the predetermined value during the work. Accordingly, it is possible to perform satisfactory work, that is, suppress application unevenness of the treatment liquid L and perform accurate work.

As explained above, the robot system 100 includes the robot arm 10 that performs predetermined work on the workpiece W1, which is the work target object, the distance detecting section 9 that detects the distance between the robot arm 10 and the workpiece W1, the target-position setting section 3A that sets, on the simple shape data DD predicted from a plurality of projection shapes obtained by projecting the workpiece W1 from different directions, a plurality of target positions $S_t$ to which the control point CP of the robot arm 10 in performing the predetermined work is moved, and the driving control section 3B that drives the robot arm 10 based on the plurality of target positions $S_t$ set by the target-position setting section 3A and a detection result of the distance detecting section 9 and performs the predetermined work such that the separation distance d1 between the workpiece W1 and the control point CP of the robot arm 10 reaches the predetermined value. Consequently, as in the first embodiment, the target-position setting section 3A can quickly perform the setting of the target positions $S_t$. Roughness of the target positions $S_t$ can be supplemented by the position control performed by the driving control section 3B. As a result, it is possible to achieve both of quick setting of the target position $S_t$ and accuracy of work on the workpiece W1.

The robot control method is a robot control method for controlling the robot 1 including the robot arm 10 that performs predetermined work on the workpiece W1, which is the work target object. The robot control method includes the target-position setting step for setting, on the simple shape data DD predicted from a plurality of projection shapes obtained by projecting the workpiece W1 from different directions, a plurality of target positions $S_t$ to which the control point CP of the robot arm 10 in performing the predetermined work is moved and the driving step for driving the robot arm 10 with position control based on the plurality of target positions $S_t$ set in the target-position setting step and the separation distance d1 between the workpiece W1 and the control point CP of the robot arm 10 and performing the predetermined work such that the separation distance d1 reaches a predetermined value. Consequently, the target-position setting section 3A can quickly perform the setting of the target positions $S_t$. Roughness of the target positions $S_t$ can be supplemented by the position control performed in the driving step. As a result, it is possible to achieve both of the quick setting of the target positions $S_t$ and accuracy of the work on the workpiece W1.

The predetermined value is a value set as appropriate according to work content and is a value stored in advance in the storing section 3C. The predetermined value may have width. That is, the predetermined value may be a predetermined numerical value range.

Other Configuration Examples of the Robot System

Figure 21:
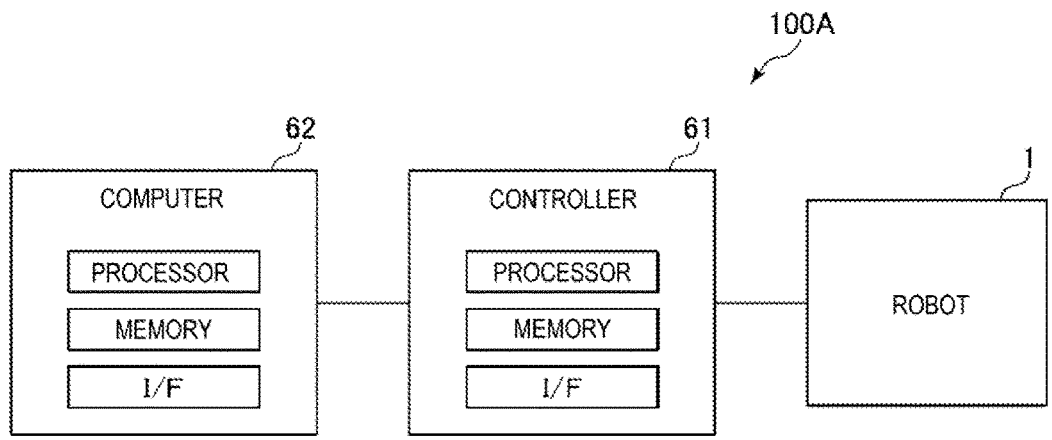
FIG. 21 is a block diagram for explaining a robot system centering on hardware.

FIG. 21 is a block diagram for explaining the robot system centering on hardware.

In FIG. 21, an overall configuration of a robot system 100A in which the robot 1, a controller 61, and a computer 62 are coupled is shown. Control of the robot 1 may be executed by reading out an instruction stored in a memory with a processor present in the controller 61 or may be executed via the controller 61 by reading out the instruction stored in the memory with a processor present in the computer 62.

Therefore, one or both of the controller 61 and the computer 62 can be grasped as the "control device".

Modification 1

Figure 22:
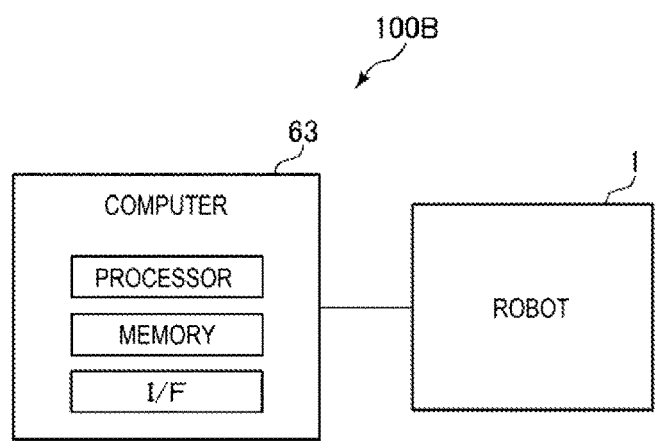
FIG. 22 is a block diagram showing a modification 1 centered on hardware of the robot system.

FIG. 22 is a block diagram showing a modification 1 centered on hardware of a robot system.

In FIG. 22, an overall configuration of a robot system 100B in which a computer 63 is directly coupled to the robot 1 is shown. Control of the robot 1 is directly executed by reading out an instruction stored in a memory with a processor present in the computer 63.

Therefore, the computer 63 can be grasped as the "control device".

Modification 2

Figure 23:
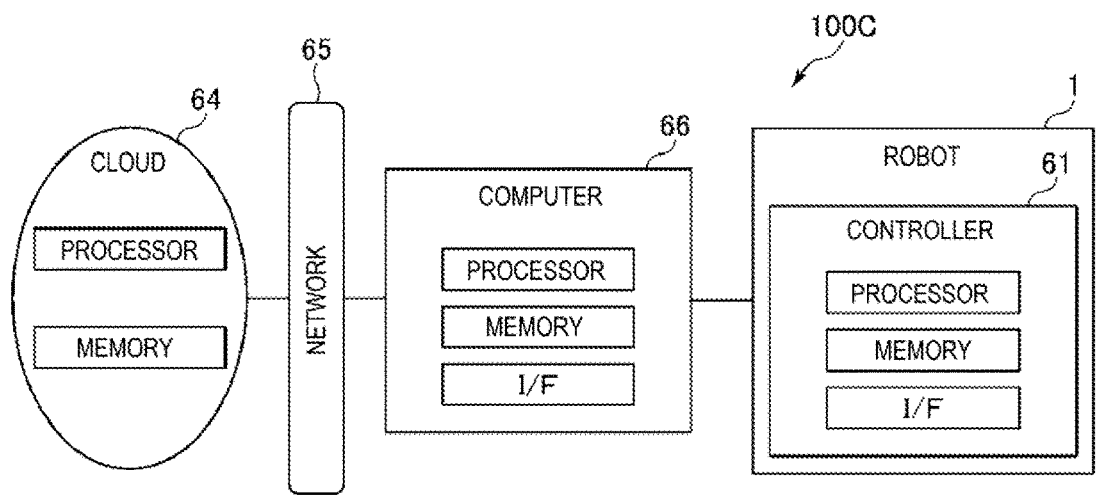
FIG. 23 is a block diagram showing a modification 2 centered on hardware of the robot system.

FIG. 23 is a block diagram showing a modification 2 centered on hardware of a robot system.

In FIG. 23, an overall configuration of a robot system 100C in which the robot 1 incorporating the controller 61 and a computer 66 are coupled and the computer 66 is coupled to cloud 64 via a network 65 such as a LAN is shown. Control of the robot 1 may be executed by reading out an instruction stored in a memory with a processor present in the computer 66 or may be executed by reading out the instruction stored in the memory with a processor present on the cloud 64 via the computer 66.

Therefore, any one, any two, or three of the controller 61, the computer 66, and the cloud 64 can be grasped as the "control device".

The robot control method and the robot system according to the present disclosure are explained about the illustrated embodiments. However, the present disclosure is not limited to the embodiments. The sections configuring the robot system can be replaced with any components that can exert the same functions. Any components may be added to the robot system.

What is claimed is:

1. A robot control method for causing a processor to execute a process to control a robot including a robot arm that performs predetermined work on a work target object, the robot control method comprising executing on the processor the steps of:
   causing a first image sensor to capture the work target object along an X axis and obtain a first captured image;
   causing a second image sensor to capture the work target object along a Y axis and obtain a second captured image, the Y axis being orthogonal to the X axis;
   causing a third image sensor to capture the work target object along a Z axis and obtain a third captured image, the Z axis being orthogonal to the X axis and the Y axis;
   generating first, second, and third 2D projection shape data of the work target object based on the first, second, and third captured images, respectively;
   generating first, second, and third 3D predicted shape data of the work target object based on the first, second, and third 2D projection shape data, respectively;
   combining the first, second, and third 3D predicted shape data to generate simple 3D shape data of the work target object;
   obtaining predicted 3D shape of the work target object based on the simple 3D shape data;
   identifying a location of the work target object based on the first, second, and third captured images in relation to a robot coordinate system;
   setting a plurality of target position on the predicted 3D shape of the work target object and saving corresponding coordinates in the robot coordinate system corresponding to the plurality of target positions in to a memory; and
   driving the robot arm along a trajectory of the plurality of target positions with force control using a force sensor to perform the predetermined work, the force sensor being configured to detect an external force applied to the robot arm and generate a detection signal, the first control being performed by the processor based on the detection signal.

2. The robot control method according to claim 1, wherein the plurality of target positions are set at a predetermined interval on ridge lines of the predicted 3D shape of the work target object.

3. The robot control method according to claim 1, wherein the processor is further configured to determine the trajectory by setting a moving order among the plurality of target positions.

4. A robot control method for causing a processor to execute a process to control a robot including a robot arm that performs predetermined work on a work target object, the robot control method comprising executing on the processor the steps of:
  causing a first image sensor to capture the work target object along an X axis and obtain a first captured image;
  causing a second image sensor to capture the work target object along a Y axis and obtain a second captured image, the Y axis being orthogonal to the X axis;
  causing a third image sensor to capture the work target object along a Z axis and obtain a third captured image, the Z axis being orthogonal to the X axis and the Y axis;
  generating first, second, and third 2D projection shape data of the work target object based on the first, second, and third captured images, respectively;
  generating first, second, and third 3D predicted shape data of the work target object based on the first, second, and third 2D projection shape data, respectively;
  combining the first, second, and third 3D predicted shape data to generate simple 3D shape data of the work target object;
  obtaining predicted 3D shape of the work target object based on the simple 3D shape data;
  identifying a location of the work target object based on the first, second, and third captured images in relation to a robot coordinate system;
  setting a plurality of target position on the predicted 3D shape of the work target object and saving corresponding coordinates in the robot coordinate system corresponding to the plurality of target positions in to a memory; and
  driving the robot arm along a trajectory of the plurality of target positions with position control using an optical sensor or a capacitance sensor to perform the predetermined work, the optical sensor or the capacitance sensor being configured to detect a separation distance between the robot arm and the work target object, the detected separation distance being maintained at a predetermined value by the processor during the predetermined work.

5. A robot system comprising:
  a robot having a robot arm, the robot arm being configured to perform predetermined work on a work target object;
  a force sensor configured to detect an external force applied to the robot arm and generate a detection signal;
  a memory configured to store a program; and
  a processor configured to execute the program so as to:
    cause a first image sensor to capture the work target object along an X axis and obtain a first captured image;
    cause a second image sensor to capture the work target object along a Y axis and obtain a second captured image, the Y axis being orthogonal to the X axis;
    cause a third image sensor to capture the work target object along a Z axis and obtain a third captured image, the Z axis being orthogonal to the X axis and the Y axis;
    generate first, second, and third 2D projection shape data of the work target object based on the first, second, and third captured images, respectively;
    generate first, second, and third 3D predicted shape data of the work target object based on the first, second, and third 2D projection shape data, respectively;
    combine the first, second, and third 3D predicted shape data to generate simple 3D shape data of the work target object;
    obtain predicted 3D shape of the work target object based on the simple 3D shape data;
    identify a location of the work target object based on the first, second, and third captured images in relation to a robot coordinate system;
    set a plurality of target positions on the predicted 3D shape of the work target object and saving corresponding coordinates in the robot coordinate system corresponding to the plurality of target position into a memory; and
    drive the robot arm along a trajectory of the plurality of the target positions with force control using the force sensor to perform the predetermined work, the force control being performed by the processor based on the detection signal.

6. A robot system comprising:
  a robot having a robot arm, the robot arm being configured to perform predetermined work on a work target object;
  an optical sensor or a capacitance sensor configured to detect a separation distance between the robot arm and the work target object;
  a memory configured to store a program; and
  a processor configured to execute the program so as to:
    cause a first image sensor to capture the work target object along an X axis and obtain a first captured image;
    cause a second image sensor to capture the work target object along a Y axis and obtain a second captured image, the Y axis being orthogonal to the X axis;
    cause a third image sensor to capture the work target object along a Z axis and obtain a third captured image, the Z axis being orthogonal to the X axis and the Y axis;
    generate first, second, and third 2D projection shape data of the work target object based on the first, second, and third captured images, respectively;
    generate first, second, and third 3D predicted shape data of the work target object based on the first, second, and third 2D projection shape data, respectively;
    combine the first, second, and third 3D predicted shape data to generate simple 3D shape data of the work target object;
    obtain predicted 3D shape of the work target object based on the simple 3D shape data;
    identify a location of the work target object based on the first, second, and third captured images in relation to a robot coordinate system;

set a plurality of target positions on the predicted 3D shape of the work target object and saving corresponding coordinates in the robot coordinate system corresponding to the plurality of target position into a memory; and drive the robot arm along a trajectory of the plurality of the target positions with position control using the optical sensor or the capacitance sensor to perform the predetermined work, the detected separation distance being maintained at a predetermined value by the processor during the predetermined work.

* * * * *